UNITED STATES PATENT OFFICE.

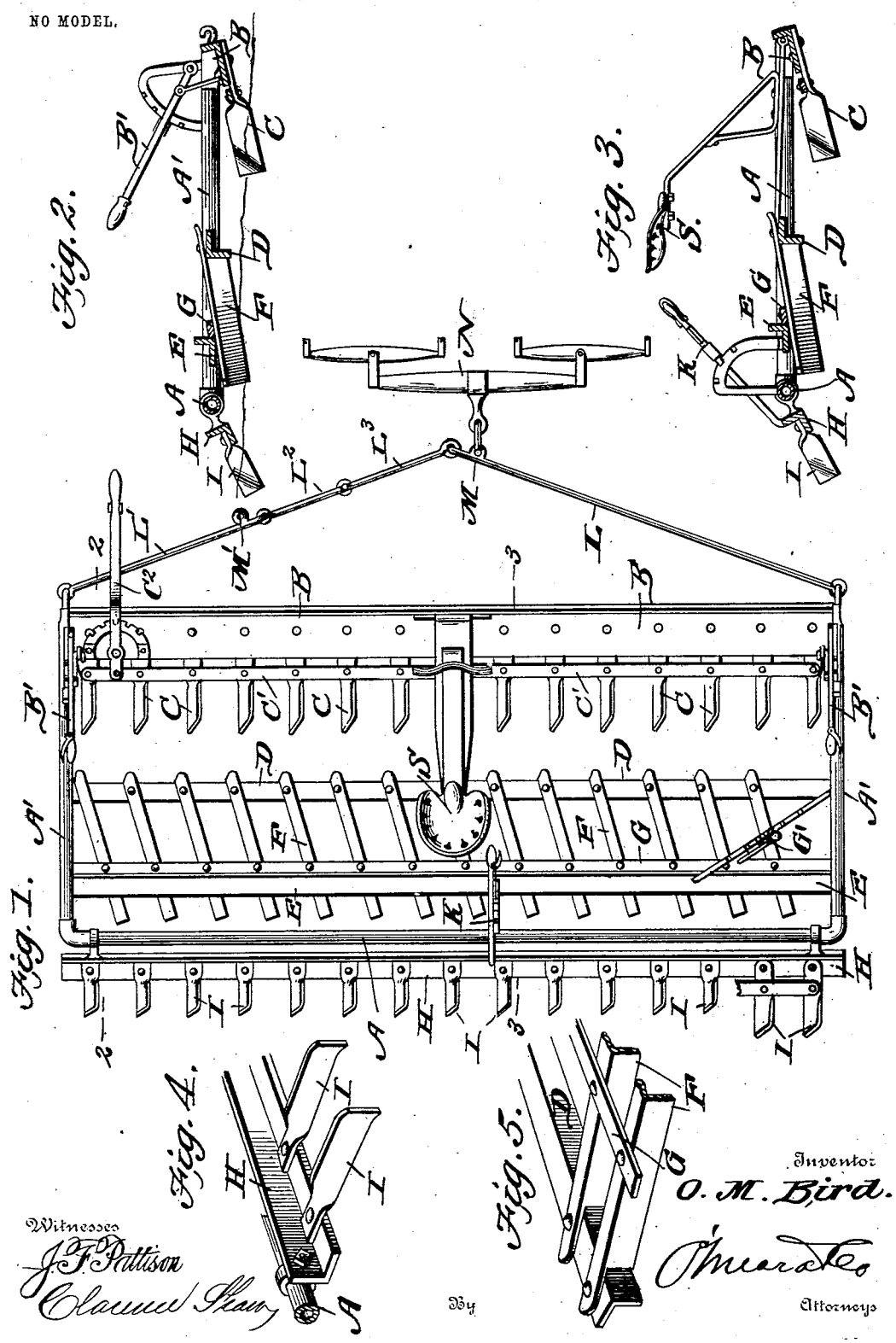

OLIVER MARION BIRD, OF BYHALIA, OHIO.

COMBINED PULVERIZER AND HARROW.

SPECIFICATION forming part of Letters Patent No. 724,375, dated March 31, 1903.

Application filed August 31, 1901. Serial No. 73,949. (No model.)

*To all whom it may concern:*

Be it known that I, OLIVER MARION BIRD, a citizen of the United States, residing at Byhalia, in the county of Union and State of Ohio, have invented a new and useful Combined Pulverizer and Harrow, of which the following is a specification.

This invention is a combined harrow and pulverizer, the object of the invention being to provide an exceedingly cheap, simple, and efficient device by means of which the earth will be broken, pulverized, and smoothed.

Another object of the invention is to provide a harrow in which the pulverizing-teeth can be adjusted as desired; and a still further object is to provide an improved draft attachment by means of which the angle of the harrow-teeth can be adjusted by changing the line of draft.

With these objects in view the invention consists, essentially, of a main frame having front and rear pivoted tooth-bars carrying harrow-teeth and an intermediate rigid tooth-bar having a series of pulverizing-teeth pivotally connected thereto and provided with means for changing the angle of said teeth.

The invention consists also in providing draft-links of different lengths and connecting them by means of a series of links, each draft-link having a draft-eye to which the draft-evener can be attached, thereby changing the line of draft, and consequently the angle of the harrow-teeth.

The invention consists also in certain details of construction and novelties of combination, all of which will be fully described hereinafter and pointed out in the claim.

In the drawings forming part of this specification, Figure 1 is a plan view of a harrow constructed in accordance with my invention. Fig. 2 is a section on the line 2 2 of Fig. 1. Fig. 3 is a section on the line 3 3 of Fig. 1. Fig. 4 is a detail perspective view of the rear tooth-bar with teeth attached, and Fig. 5 is a perspective view of the intermediate tooth-bar with teeth attached and showing the shifting-rod.

In carrying out my invention I employ an essentially rectangular-shaped frame formed of gas-pipe or other suitable material and comprising the rear beam A and side beams A', the forward ends of the side beams being connected by means of an angle-beam B, carrying a series of rearwardly-projecting teeth C. The angle-beam B is adjustable by means of a hand-lever B', so that the teeth C can be regulated to any angle desired, and in order to make the teeth C laterally adjustable I provide a shifting-bar C', which is pivotally connected to each tooth and controlled by a lever $C^2$, which is pivoted to and at one end of the angle-beam B. By this arrangement the angles of the teeth may be regulated without changing the connection of the draft-link, hereinafter referred to. The side members A' are also connected by means of angle-bars D and E, said bars being arranged parallel with the rear beam A.

A series of teeth F are pivotally connected to the angle-bar D and extend rearwardly beneath the angle-bar F, said teeth being essentially angular in form, as most clearly shown in Fig. 5, and a shifting-bar G is pivotally connected to the said teeth in advance of the angle-bar F, said shifting-bar being connected to a lever G', by means of which the angle of the teeth F can be adjusted as desired.

An angle tooth-bar H is pivotally connected to the rear beam A and carries a series of teeth I, said bar having a lever K connected thereto, by means of which the angle of the bar can be adjusted, and consequently the position of the teeth. The teeth I of the bar H may be also provided with a shifting-bar for adjusting the teeth laterally similar to the teeth C and as shown at one end of the bar in Fig. 1.

L indicates a draft-link pivotally connected to the forward end of one of the side beams, and L' a similar link pivotally connected to the forward end of the opposite side beam, and $L^2$ and $L^3$ indicate intermediate links connecting the links L and L'. The link L has an eye M, to which the draft-evener N is attached, and the link L' has an eye M', to which the draft-evener can be attached whenever it is desired to shift or change the draft of the front and rear harrow-teeth.

When the draft is applied to the eye M, the harrow will practically be drawn in a straight line; but when the draft is applied to the eye M' the front and rear teeth will be drawn through the earth at an angle, thereby increasing the efficiency of the harrow. The front and rear teeth are adjusted vertically and are intended to cut or crush the clods of earth, whereas the intermediate teeth are adjustable laterally and are normally arranged at an inclination, so that they subject the earth to a scraping action somewhat similar to a series of disks, and the efficiency of the harrow as a whole is thereby greatly increased.

It will thus be seen that I provide an exceedingly cheap and simple and efficient construction of harrow, and it will of course be understood that any suitable means of supporting the seat S may be employed.

Having thus fully described my invention, what I claim as new, and desire to secure by Letters Patent, is—

In a harrow, the combination with a suitable frame, an angle-bar extending transversely across the front of said frame, flat cutting-teeth secured to the under side of said bar having their edges downwardly and rearwardly inclined, a shifting-bar pivoted to each tooth, a lever at one side of said frame movable horizontally and connected to the shifting-bar, a second adjacent lever movable vertically and adapted to raise or depress said angle-bar, and a plurality of angle-bars bearing adjustable teeth parallel to and rearward of the first-named bar.

OLIVER MARION BIRD.

Witnesses:
W. A. YINGER,
F. A. HARTLEY.